United States Patent
Guest

[11] Patent Number: 5,915,738
[45] Date of Patent: Jun. 29, 1999

[54] TUBE COUPLINGS

[76] Inventor: John Derek Guest, "Iona", Cannon Hill Way, Bray, Maidenhead, Berkshire SL6 2EX, United Kingdom

[21] Appl. No.: 08/687,744

[22] Filed: Jul. 26, 1996

[30] Foreign Application Priority Data

Jul. 28, 1995 [GB] United Kingdom ............... 9515497
Jan. 19, 1996 [GB] United Kingdom ............... 9601097

[51] Int. Cl.⁶ .................................................. F16L 35/00
[52] U.S. Cl. ........................... 285/24; 285/308; 285/315; 285/319; 285/322
[58] Field of Search ................................ 285/322, 323, 285/24, 27, 38, 308, 319, 315

[56] References Cited

U.S. PATENT DOCUMENTS 4,083,586  4/1978  Helm ........................................ 285/323
5,407,236  4/1995  Schwarz et al. ..................... 285/322 X

FOREIGN PATENT DOCUMENTS 0 448 790  10/1991  European Pat. Off. .
4334529    4/1994   Germany ............................... 285/322
4243844    6/1994   Germany ............................... 285/323
4370489    12/1992  Japan ..................................... 285/322
2041476    9/1980   United Kingdom ................... 285/323
2 240 149  7/1991   United Kingdom .
2 249 150  4/1992   United Kingdom .
4021953    9/1994   WIPO ..................................... 285/322

OTHER PUBLICATIONS

"Wiring Harness News", Warwick, RI, "ETCO", Jul./Aug. 1996.

*Primary Examiner*—Dave W. Arola
*Attorney, Agent, or Firm*—Baker & Daniels

[57] ABSTRACT

The disclosure relates to a tube coupling comprising a coupling body having a throughway open at one end of the body to receive a tube. A collet is located in the throughway having an annular element and at least one radially resilient finger extending axially from the element toward said open end of the throughway. The coupling body has a stop face directed along the throughway axis away from said open end and the distal end of the finger has on its inner side a projection to engage a feature on the tube and on its outer side a first, axially facing abutment directed towards the open end of the throughway to engage with the stop face and a further, radially facing abutment engageable with the coupling body when the axially facing abutment engages the stop face to constrain the distal end of the finger against radial outward movement and thereby to prevent release of the projection on the finger from the feature on the tube and release of the tube from the coupling body.

20 Claims, 7 Drawing Sheets

TUBE COUPLINGS

BACKGROUND OF THE INVENTION

1. Field of the Invention

This invention relates to tube couplings and in particular to tube couplings for use with tubes having a feature such as a flange, projection or groove with which positive engagement is to be made by the coupling. For example, the coupling may be used in the fuel or a brake line of a motor vehicle.

2. Background Prior Art

European Patent Publication No. 0 663 557 discloses a tube coupling comprising a coupling body having a throughway open at one end to receive a tube, an open ended housing on the body projecting from said one end thereof through which a tube may extend into the throughway and the body. A collet is mounted in the housing for limited axial movement and has an annular part with resilient legs projecting therefrom towards the open end of the housing and terminating in means to engage a formation on the tube to hold the tube in the coupling body. The housing has an end region remote from the coupling body in which the collet ends are constrained against expansion to release a tube hold thereby and an intermediate region in which the ends may expand to release a tube and means are provided on the collat projecting into and held in the throughway of the coupling body when a tube is present to restrain the collet so that the free ends of the collet legs are prevented from moving beyond the end region of the housing to a position in which they could expand and release the tube. This arrangement has the disadvantage that it is necessary to provide a means of restraint for limiting axial movement of the collet in the coupling body. This may be in the form of a second collet arrangement or an interlock arrangement with the coupling body. An object of the invention is to simplify the construction to avoid the need for such a secondary device.

SUMMARY OF THE INVENTION

The invention provides a tube coupling comprising a coupling body having a throughway open at one end of the body to receive a tube, a collet located in the throughway having an annular element and at least one radially resilient finger extending axially from the element toward said open end of the throughway, the coupling body having a stop face directed along the throughway axis away from said open end, the distal end of the finger having on its inner side a projection to engage a feature on the tube and on its outer side first axially facing abutment directed towards the open end of the throughway to engage with the stop face and a further, radially facing abutment engageable with the coupling body when the axially facing abutment engages the stop face to constrain the distal and of the finger against radial outward movement and thereby to prevent release of the projection on the finger from the feature on the tube and release of the tube from the coupling body.

Preferably the first and further abutments on the distal end of the finger are formed adjacent each other to engage the stop face and the adjacent face of the throughway in the coupling body respectively.

It is also preferred that the distal end of the finger has inwardly projecting tooth formation to engage in the feature on a tube to be retained in the coupling body.

In any of the above arrangements the coupling body adjacent said open end of the throughway may be of cylindrical form having a rectangular aperture in its wall for the or each resilient finger on the collet, the side of the aperture adjacent to and facing away from the open end of the coupling body providing said stop face for engagement by the first abutment on the collet finger.

In a further construction the coupling body adjacent said open end may be formed with a channel section recess encircling the throughway, the side of which adjacent the open and of the coupling body races away from the open end to provide said stop face for engagement by the first abutment on the or each resilient finger of the collet.

In either of the latter arrangements a plurality of resilient fingers may be formed on the collet and a corresponding plurality of rectangular apertures are formed in the sleeve portion of the collet wall.

More specifically the collet may have four resilient fingers.

In any of the above arrangements means may be provided for displacing the collet in a direction away from said open end of the throughway to disengage the first/further abutments on the collet finger from the stop face/coupling body to allow the fingers to be displaced radially outwardly for entry/extraction of a tube into/out of the throughway in the coupling body.

In the latter construction the means to displace the collet comprise a cover slidably mounted on the coupling body for movement parallel to the throughway axis, the cover having an end wall extending over the end of the coupling body with an inner sleeve projecting into the throughway in the coupling body to engage the distal end of the or each collet finger to displace the collet inwardly of the open end of the coupling body, a tube being inserted into the coupling body through the inner sleeve in the cover.

More specifically the collet may have an extension projecting through the open end of the coupling body and formed with an annular head overlying the end of the coupling body around the open end of the throughway which can be depressed towards the end of the coupling body to release the first abutment of the or each collet finger from the stop face on the coupling body.

Further, a cover may be slidably mounted on the coupling body to extend over the end of the coupling body and said head of the collet 80 that sliding movement of the cover over the coupling body in one direction displaces the collet head towards the end of the coupling body and thereby disengages the first abutment of the or first finger from the stop face on the coupling body, the cover having an aperture through which a tube is inserted into the coupling body.

Alternatively a fixed cover may be mounted on the coupling body to extend over the open end of the throughway into the coupling body and having one or more resiliently displaceable cam elements for engaging the outer side of the head of the collet to displace the collet head towards the end of the coupling body and thereby release the first abutment of the or each resilient finger of the collet from the stop face on the coupling body.

The collet may comprise a sleeve having an aperture or apertures at spaced locations around the sleeve in which a resilient collet finger or fingers is/are provided.

In any of the above arrangements a further collet may be provided in the throughway engaged with a first collet and having a resilient finger or fingers projecting axially along the throughway away from the open end thereof and a tapered cam surface is provided in the throughway reducing towards the open end of the throughway with which the fingers of the further collet are engageable to be compressed thereby and to grip a tube in the throughway.

DESCRIPTION OF THE PREFERRED EMBODIMENTS

Figure 1:
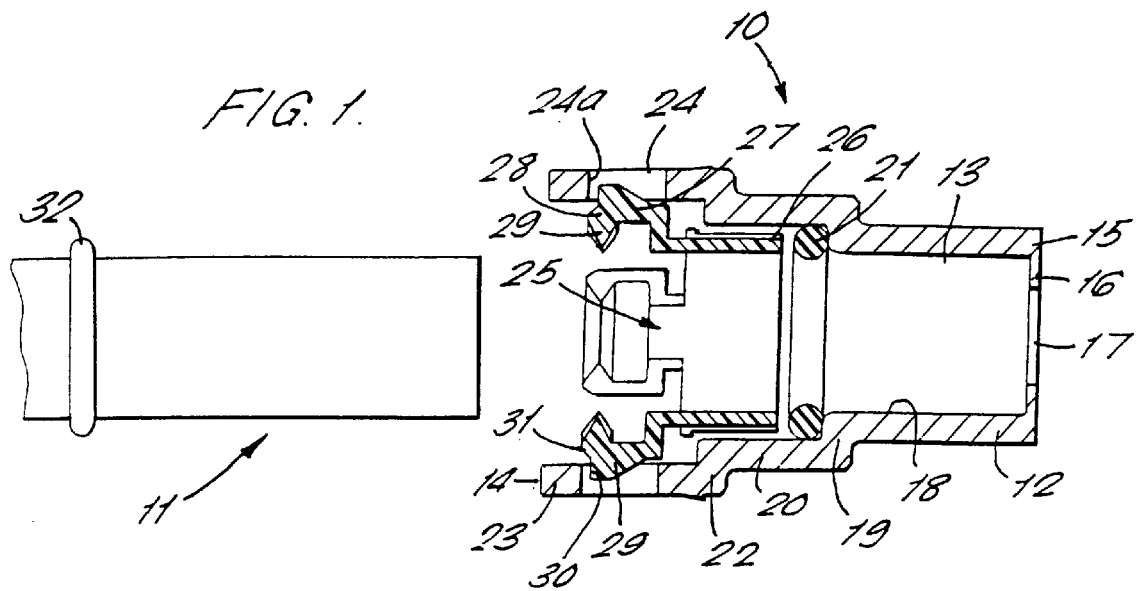
FIG. 1 is a sectional view through a tube coupling including a form of collet for locking a tube in the coupling.

Referring firstly to FIG. 1 of the drawings, there is shown a tube coupling indicated generally at 10 for receiving a tube an end part of which is indicated at 11. The coupling comprises a coupling body 12 through which a throughway 13 extends from one end 14 of the coupling body where the throughway is open to receive the tube 11 to the other end 15 where there is an inturned flange 16 having a central aperture 17 through which fluid can flow.

The internal diameter 18 of the throughway adjacent end 15 of the coupling body is selected to receive the tube 11 with a close fit and the flange 16 forms an end stop for the tube. Halfway along the coupling body, the wall of the body is formed with a step 19 leading to an intermediate portion 20 having enlarged internal diameter and an O-ring seal 21 is lodged Against the step to form a seal between the outer surface of the tube 11 and the inner surface of the coupling body.

The intermediate section 20 of the coupling body has a step 22 connecting the intermediate section to a further enlarged end portion 23 of the coupling body in which the open end to the throughway 13 is formed. The enlarged end portion of the coupling body 23 is formed with four rectangular apertures 24 at spaced locations around the wall to receive collet fingers for locking a tube in the coupling body.

A collet is located between the intermediate and enlarged portions of the coupling body indicated generally at 25 and comprising an annular sleeve 26 which locates with clearance in the intermediate section of the coupling body and has four collet fingers 27 equi-spaced around the sleeve which are outwardly cranked or hooked and extend towards the open end of the sleeve. The fingers terminate in heads 28 having inturned teeth 29 to engage an upstanding flange formation on the tube 11 as described below.

The outer sides of the heads 28 of the fingers have upstanding abutments 29 which project into the apertures 24 in the collet wall and are formed with abutment faces 30 facing axially of the throughway towards the open end of the body and are directly opposite side faces of the apertures 24 in the coupling body wall nearest the open end of the body which form stop faces 24a to retain the collet in the coupling body.

Each collat head has a further abutment face 31 at the inner end of face 30 which is angled outwardly with respect to the head to engage the inner surface of the throughway adjacent the aperture 24 and thereby prevent radial outward movement of the heads 28 when the first abutment faces 30 are in engagement with the stop faces 24a provided by the apertures 24.

The tube 11 to be inserted in the coupling body has an encircling integral flange 32 located adjacent the end of the tube. To lock a tube in the coupling body, the tube end is inserted into the open end of the coupling body through the collet and seal 21 into the reduced diameter portion 18 of the throughway until the end of the tube engages the flange 16. In inserting the tube through the collet, the flange 32 eventually engages the teeth 29 and the collet is drawn with the tube until the annular part 26 of the collet engages the annular seal 21. By this time the outwardly facing abutment faces 31 on the heads will have moved opposite the apertures in the collet wall and the heads of the collet can then spring outwardly into the apertures as the teeth snap over the flange 32. When the tube is drawn forward slightly, the collet is drawn with the tube by engagement of the teeth 29 with the flange 32 until the axially directed abutment faces 30 on the collet heads engage the stop faces in the apertures to prevent further movement of the collet with the tube. The flange on the tube is held by the teeth on the collet and the heads of the collet are prevented from expanding outwardly by engagement of the outwardly directed abutment faces 31 on the heads with the wall of the throughway next to the stop faces. The tube is then firmly locked in the is coupling body and cannot be removed.

To release the tube from a coupling body, a tool is inserted between the tube and wall of the coupling body to stop the collet coming forward with the tube as the tube is drawn outwardly from the coupling body. The collet heads can then spring apart into the apertures 24 thereby releasing the tube which can then be fully extracted from the coupling body.

Figure 2:
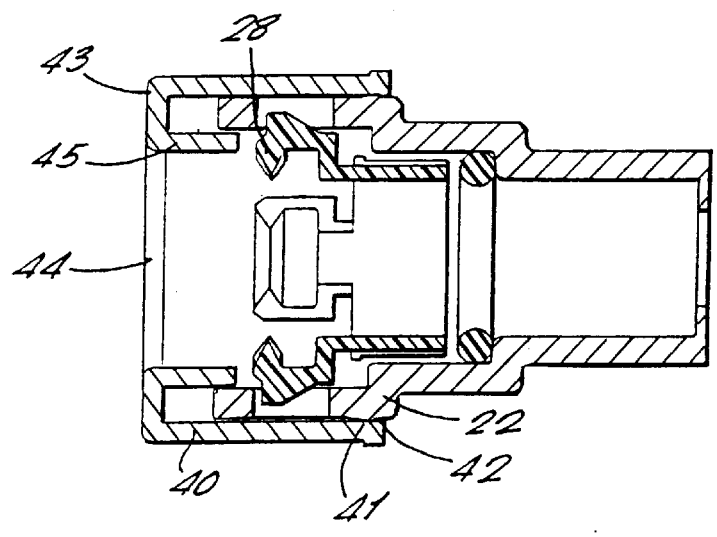
FIG. 2 is a view of a similar tube coupling to that shown in FIG. 1 with a cover having an integral release sleeve for releasing the collet to allow a tube to be extracted.

FIG. 2 shows a modified form of the coupling body shown in FIG. 1 in which a cover 40 is slidably mounted on the enlarged end portion of the coupling body and is retained by an upstanding annular abutment 41 on the coupling body adjacent the step 22 and engageable with an inturned annular rib 42 around the open end of the cover. The other and of the cover is closed by an integral end wall 43 having a central opening 44 and an inturned integral sleeve 45 which projects into the open end of the coupling body to engage the heads 28 of the collet. By depressing the cover towards the coupling body, the sleeve 45 bears on the heads 28 of the collet to disengage the abutment faces 30 on the collet heads from the stop faces 24a on the collet wall sufficiently to allow the heads 28 of the collet to spring outwardly over the flange 32 on the tube as the tube is inserted in or withdrawn from the coupling body. The arrangement is otherwise similar to that described above.

Figure 3:
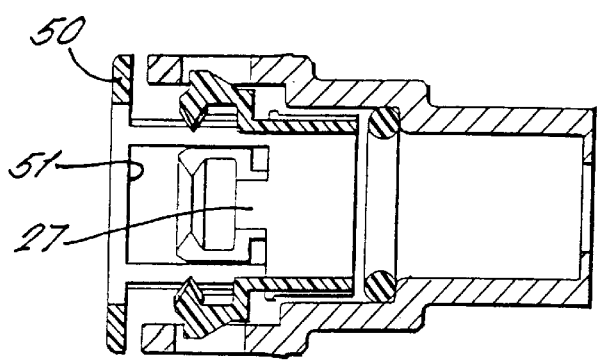
FIG. 3 shows a modified form of the coupling of FIG. 1 having extended collet projecting outside the coupling body to facilitate release of the collet.

FIG. 3 shows a further modification based on the construction of FIG. 1 in which the sleeve 26 of the collet is extended to project out of the open end of the coupling body and is formed with an annular out turned head 50 which overlies the end of the coupling body. The collet fingers 27 are formed in rectangular apertures 51 in the sleeve. The position of the collet in the coupling body can be adjusted manually by pushing or pulling the head 50 of the collet towards or away from the end of the coupling body to engage or disengage the heads of the collet with the stop faces on the apertures 24 in the collet wall to lock or release the heads against radial movement as required.

Figure 4:
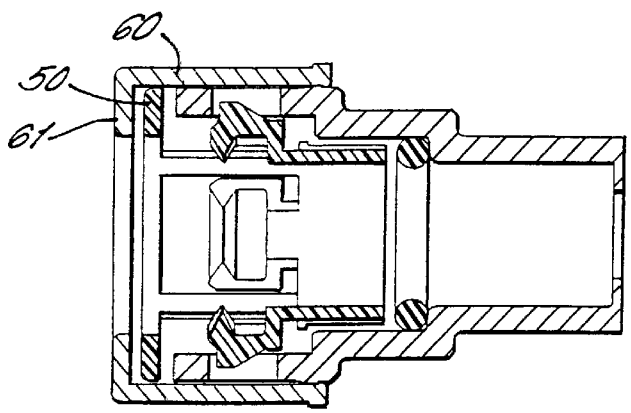
FIG. 4 shows a similar tube coupling to that of FIG. 3 with a sliding cover fitted to the coupling body and engageable with the extended collet to release the collet.

FIG. 4 shows a further arrangement which combines the coupling of FIG. 3 with a cover 60 slidably mounted on the coupling body in a similar way to the cover 40 of FIG. 2. In this case however the inner sleeve 45 of the cover is omitted and engagement of the bottom wall 61 of the cover with the head 50 of the collect is used to displace the collet in the coupling body as required to lock or release the heads of the collet.

Figure 5:
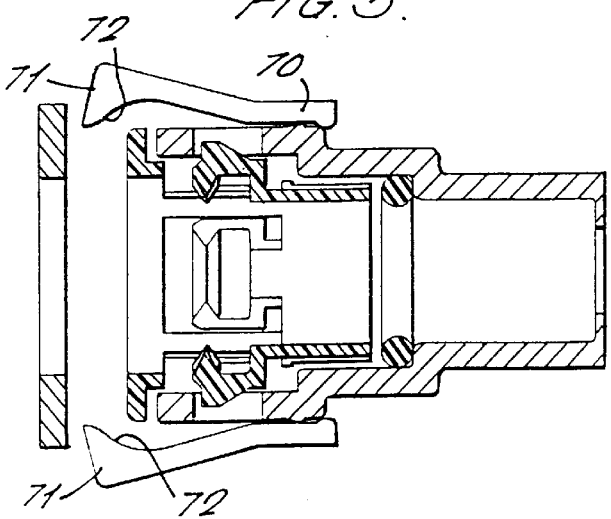
FIG.5 shows a further form of cover for the coupling body having push buttons mounted on the cover for releasing the collet.

FIG. 5 shows a further form of cover 70 mounted on the collet having integral radially movement button 71 which have inclined faces 72 shaped to bear on the head 50 of the collet to drive the collet inwardly with respect of the collet body when the buttons 71 are depressed inwardly, The arrangement otherwise functions in a similar manner to that of the previous figure.

Figure 6:
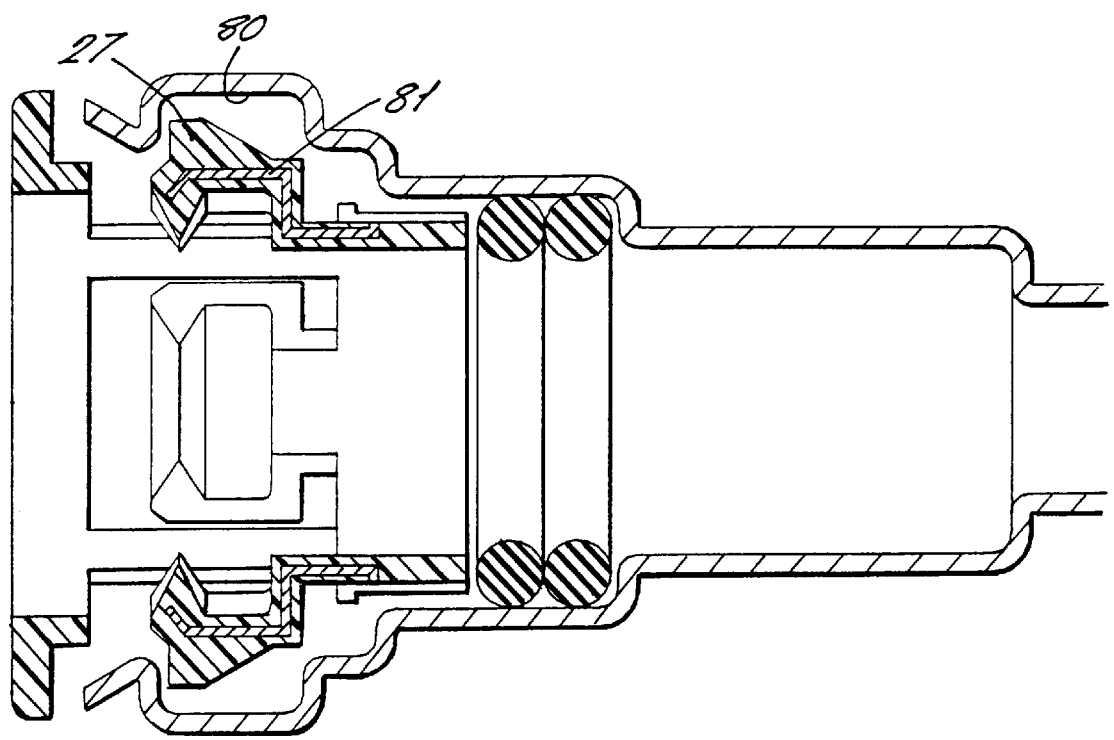
FIG. 6 is a similar view to that of FIG. 3 showing a modified form of coupling body.

FIG. 6 of the drawings shows a similar arrangement to that of FIG. 3 except that the collet body is formed with a thin wall in metal and instead of having apertures 24 in which the collet heads 28 are engageable is provided with an annular channel section 80 in the enlarged end portion of the collet body. The collet is formed in plastics as before and has an inner metal skeleton 81 to verity the location is of the collet in the coupling body should the plastics material of the coupling body be destroyed by fire or possibly chemical action.

Figure 7:
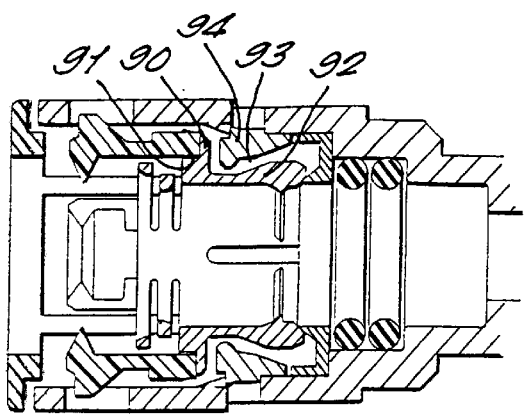
FIG. 7 is a similar view to that of FIG. 3 incorporating a secondary collet.

FIG. 7 shows a further modification to the arrangement of FIG. 3 in which a secondary collat is provided in the coupling body beyond the first collet from the open end of the coupling body. The secondary collet has an annular element 90 formed with a rebate 91 in which the end of the sleeve 26 of the first collet is seated. The secondary collet has resilient fingers 92 protecting from the annular element away from the open end of the coupling body which are engageable with a tapered cam surface 93 formed on an insert sleeve 94 mounted in the coupling body. Engagement of the fingers 92 of the collat with the tapered can surface forces the fingers inwardly to grip end and engage a tube inserted in the throughway of a coupling body.

When the first or primary collet is depressed into the coupling body to release the heads of the collet, the fingers 92 of the secondary collet 92 will also be released from the tapered cam surface 93 allowing insertion or extraction of a tube to or from the coupling body.

Figure 8:
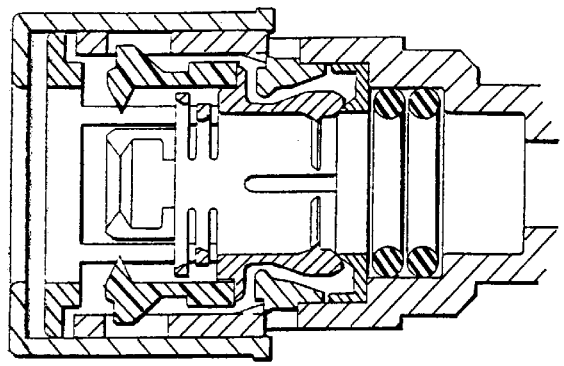
FIG. 8 is a similar view to FIG. 4 incorporating a secondary collet.

FIG. 8 of the drawings shows a modified form of the arrangement shown in FIG. 7 in which a cover similar to the cover 40 of FIG. 4 is provided.

Figure 9:
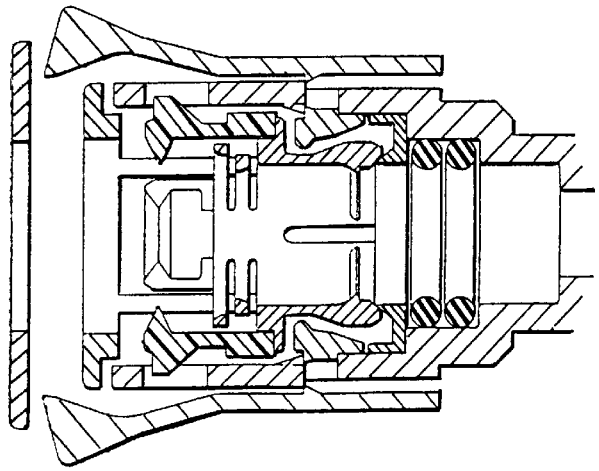
FIG. 9 is a similar view to FIG. 5 incorporating a secondary collet.

FIG. 9 of the drawings shows a similar arrangement to FIG. 7 with a cover having radial buttons similar to the button 71 of FIG. 5 for releasing the primary and also the secondary collets.

Figure 10:
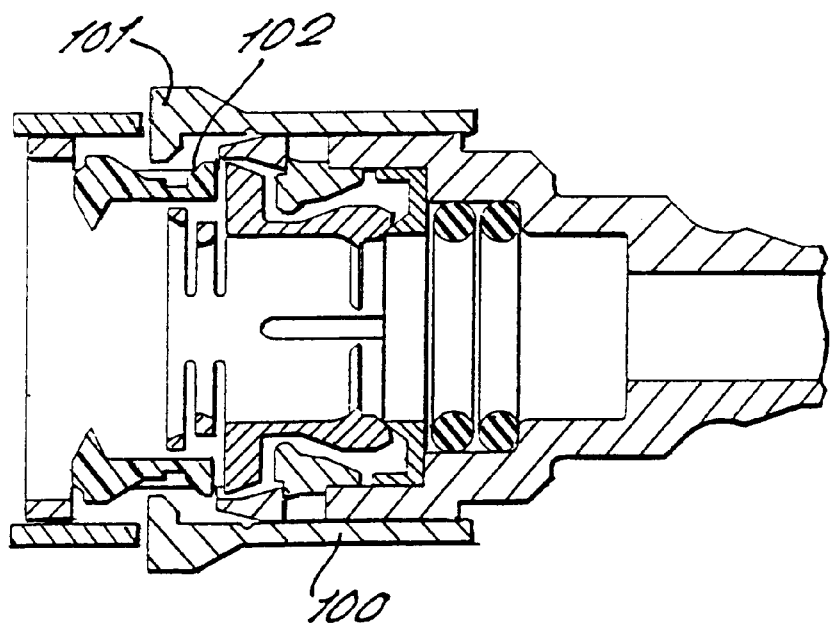
FIG. 10 is similar view to FIG. 1 incorporating secondary collet.

FIG. 10 shows an alternative arrangement to that of FIG. 9 in which the extended portion of the sleeve of the primary collet projecting from the open end of the coupling body is omitted. A cylindrical cover 100 is mounted on the coupling body and has integral radially moveable buttons 101 which can act on a cam surface 102 formed on the sleeve of the primary collet to displace the collet axially away from the open end of the coupling body to release the primary and secondary collet for insertion/extraction of a tube from the coupling body.

Figure 11:
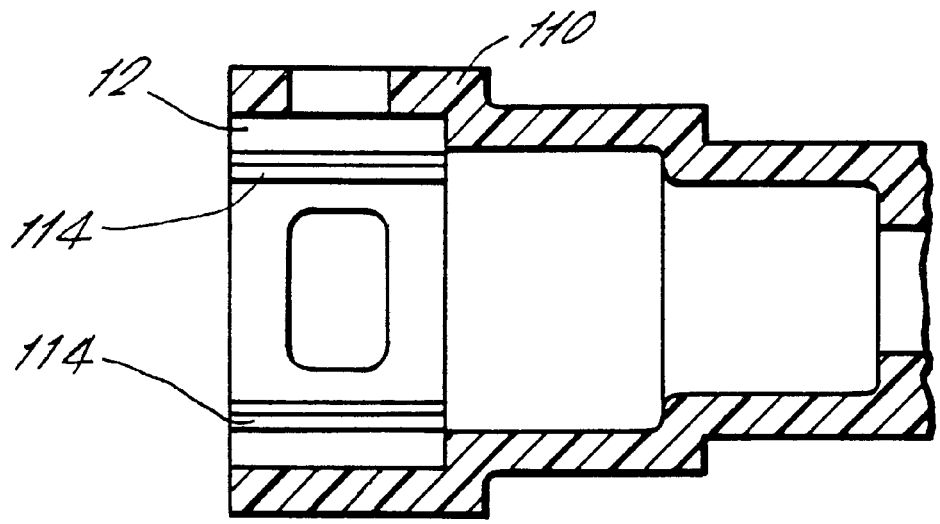
FIG. 11 is a plan view of a further form of a coupling body in accordance with the invention.
Figure 12:
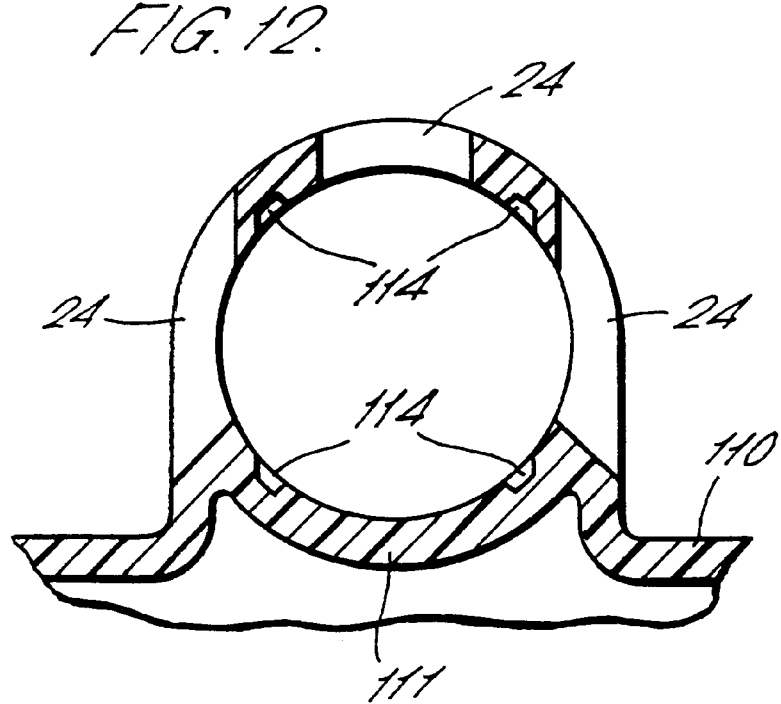
FIG. 12 is a sectional view through the coupling body of FIG. 11.

In the embodiments described above, the collet has four equi-spaced fingers and the coupling body has four rectangular apertures in which the fingers are engageable for locking the tube in the coupling body. The coupling body of FIGS. 11 and 12 is formed integrally in a wall 110 of an enclosure with the axis of the coupling body extending parallel to the wall.

Figure 13:
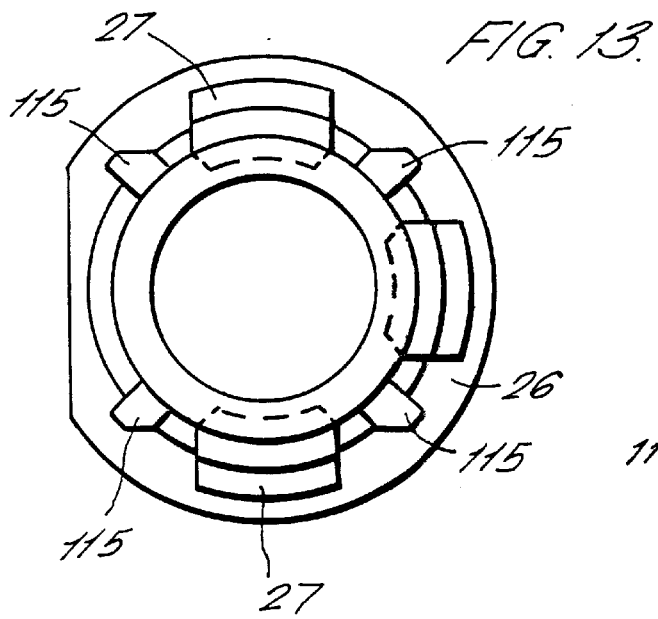
FIG. 13 is an end view of a collet for use with the coupling body of FIGS. 11 and 12.
Figure 14:
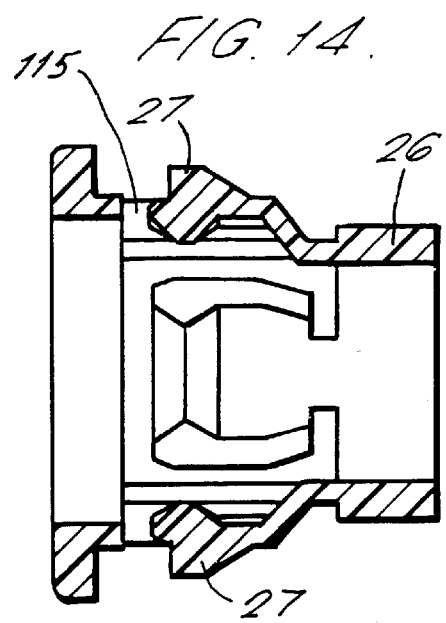
FIG. 14 is a sectional view through the collet of FIG. 13.
Figure 15:
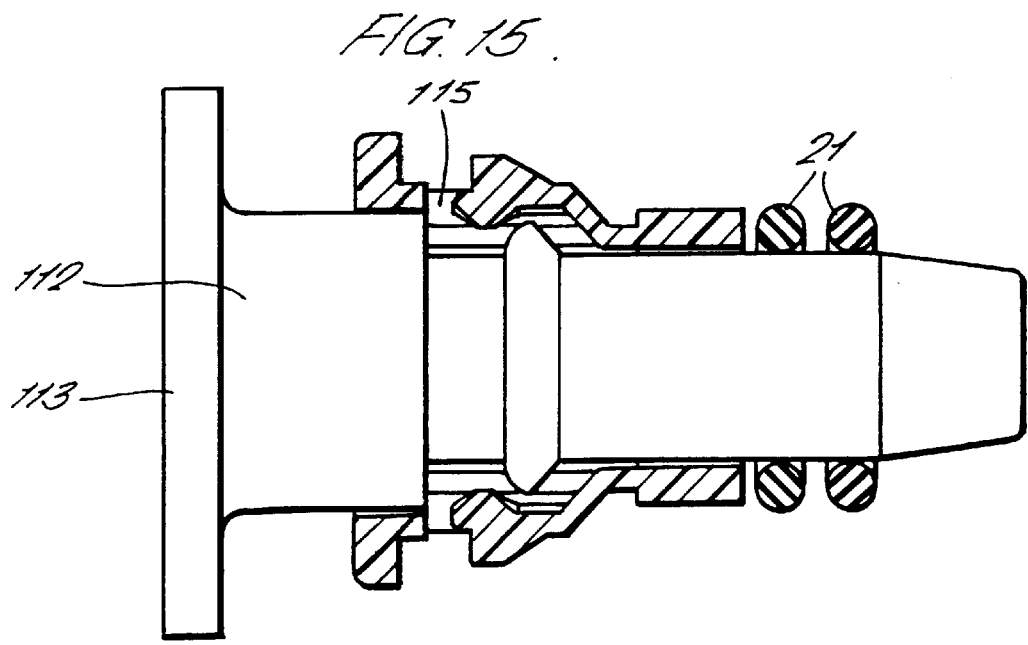
FIG. 15 is a sectional view through the collet showing a stuffer pin inserted in the collet with encircling O-ring seals.

The part of the coupling body which forms part of the wall of the enclosure is therefore made solid, as indicated at 111, to prevent loss of fluid from the enclosure. The coupling body has three rectangular apertures 24 at the top and on either side of the coupling body to receive three fingers 27 on the collet the collet is illustrated in FIGS. 13 and 14 and also in FIG. 15. In the latter illustration a stuffer pin 112 is inserted in the collet to project through the collet. The pin provides a useful tool for the assembly of the collet and O-ring seals in the coupling body and to that end, the O-ring seal 21 are assembled on the end of the stuffer pin projecting from the inner end of the collet. The stuffer pin has an elongate integral cross-bar 113 at its other end to facilitate extraction of the pin once the collet/O-ring seal arrangement has been assembled in the coupling body.

The enlarged diameter open end part of the coupling body has four axially extending slots 114 formed on the inner side of the body between the apertures 24 with which four axial splines 115 on the outer side of the collet between the fingers 27 engage to ensure that the collet is correctly aligned in the coupling body with the fingers 27 aligned with the aperture 24.

I claim:

1. A tube coupling comprising a coupling body having a throughway open at one end of the body to receive a tube, a collet located in the throughway having an annular sleeve and at least one radially resilient finger extending axially from the sleeve toward said open end of the throughway, the coupling body having a stop face directed along the throughway axis away from said open end, the distal end of the finger having on its inner side a projection to engage a feature on the tube and on its outer side first axially facing abutment directed towards the open end of the throughway to engage with the stop face and a further, radially facing abutment engageable with the coupling body when the first axially facing abutment engages the stop face to constrain the distal end of the finger against radial outward movement and thereby prevent release of the projection on the finger from the feature on the tube and prevent release of the tube from the coupling body wherein said resilient finger has a first portion extending radially outward of said sleeve, a second portion extending axially from a radially outer end of said first portion and a radial element disposed at a distal end of said second portion, said projection and said first axially facing abutment disposed on said radial element.

2. A tube coupling as claimed in claim 1, wherein the first and further abutments on the distal end of the finger are formed adjacent each other to engage the stop face and an adjacent face of the throughway in the coupling body respectively.

3. A tube coupling as claimed in claim 1, wherein the projection on the distal end of the finger has an inwardly projecting tooth formation to engage the feature on the tube to be retained in the coupling body.

4. A tube coupling as claimed in claim 1, wherein the coupling body adjacent said open end of the throughway is of cylindrical form having a rectangular aperture in its wall for said resilient finger on the collet, the side of the aperture adjacent to and facing away from the open end of the coupling body providing said stop face.

5. A tube coupling as claimed in claim 4, wherein a plurality of resilient fingers are formed on the collet and a corresponding plurality of rectangular apertures are formed in the cylindrical portion of the collet wall.

6. A tube coupling as claimed in claim 5, wherein the collet has four resilient fingers.

7. A tube coupling as claimed in claim 1, wherein the coupling body adjacent said open end is formed with a channel section recess encircling the throughway, the side of which adjacent the open end of the coupling body faces away from the open end to provide said stop face.

8. A tube coupling as claimed in claim 1, wherein means are provided for displacing the collet in a direction away from said open end of the throughway to respectively disengage the first and further abutments on the collet finger from the stop face and coupling body to allow the finger to be displaced radially outwardly for axial movement of the tube within the throughway in the coupling body.

9. A tube coupling as claimed in claim 8, wherein the means to displace the collet comprise a cover slidably mounted on the coupling body for movement parallel to the throughway axis, the cover having an end wall extending over the end of the coupling body with an inner sleeve projecting into the throughway in the coupling body to engage the distal end of the collet finger to displace the collet inwardly of the open end of the coupling body, a tube being inserted into the coupling body through the inner sleeve in the cover.

10. A tube coupling as claimed in claim 8, wherein the collet sleeve has an aperture in which a resilient collet finger is disposed.

11. A tube coupling as claimed in claim 8, wherein said means comprise an extension on the collet, said collet extension projecting through the open end of the coupling body and formed with an annular head overlying the end of the coupling body around the open end of the throughway which can be depressed towards the end of the coupling body to release the first abutment of the collet finger from the stop face on the coupling body.

12. A tube coupling as claimed in claim 11, wherein a cover is slidably mounted on the coupling body to extend over the end of the coupling body and said head of the collet so that sliding movement of the cover over the coupling body in one direction displaces the collet head towards the end of the coupling body and thereby disengages the first abutment of the finger from the stop face on the coupling body, the cover having an aperture through which a tube is inserted into the coupling body.

13. A tube coupling as claimed in claim 11, wherein a fixed cover is mounted on the coupling body to extend over the open end of the throughway into the coupling body and having at least one resiliently displaceable cam element for engaging the outer side of the head of the collet to displace the collect head toward the end of the coupling body and thereby release the first abutment of the resilient finger of the collet from the stop face on the coupling body.

14. A tube coupling as claimed in claim 1, wherein a further collet is provided in the throughway, said further collet engaged with said collet, said further collet having a further resilient finger projecting axially along the throughway away from the open end thereof and a tapered cam surface is provided in the throughway reducing towards the open end of the throughway with which the further finger of the further collet is engageable to be compressed thereby and to grip the tube in the throughway.

15. A tube coupling comprising:

a coupling body having a throughway open at one end of the body to receive a tube;

a collet located in the throughway having an annular element and at least one radially resilient finger extending axially from the element toward said open end of the throughway, the coupling body having a stop face directed along the throughway axis away from said open end, the distal end of the finger having on its inner side a projection to engage a feature on the tube and on its outer side a first axially facing abutment directed towards the open end of the throughway to engage with the stop face and a further, radially facing abutment engageable with the coupling body when the first axially facing abutment engages the stop face to constrain the distal end of the finger against radial outward movement and thereby prevent release of the projection on the finger from the feature on the tube and prevent release of the tube from the coupling body; and alignment means disposed between the collet and the coupling body for aligning the collet finger with the stop face while allowing the collet to axially slide relative to the coupling body, the alignment means disposed at an axial position whereby the stop face is axially located between the alignment means and the open end.

16. A tube coupling as claimed in claim 15, wherein the collet includes has plurality of fingers and the coupling body has a corresponding number of apertures, each of the apertures having a side surface facing away from the open end of the coupling body and defining the stop face for one of the fingers, and the alignment means is disposed between two of the apertures.

17. A tube coupling as claimed in claim 15, wherein the first and further abutments on the distal end of the finger are formed adjacent each other to engage the stop face and the adjacent face of the throughway in the coupling body respectively.

18. A tube coupling as claimed in claim 15, wherein the alignment means comprises at least one spline disposed on the collet engageable with an axially extending slot disposed in the throughway on the coupling body.

19. A tube coupling as claimed in claim 15, wherein the collet has an extension projecting through the open end of the coupling body and the alignment means comprises at least one spline disposed on the extension, the spline engaging an axially extending slot disposed in the throughway on the coupling body.

20. A tube coupling as claimed in claim 19, wherein said collet has a plurality of fingers and said coupling body has a corresponding number of apertures, each of the apertures having a side surface facing away from the open end of the coupling body and defining the stop face for one of the fingers, and the slot is disposed between two of the apertures.

* * * * *